United States Patent [19]

McRae et al.

[11] 4,398,062
[45] Aug. 9, 1983

[54] APPARATUS FOR PRIVACY TRANSMISSION IN SYSTEM HAVING BANDWIDTH CONSTRAINT

[75] Inventors: Daniel D. McRae; Frank A. Perkins, both of West Melbourne; Edward B. Glover, Melbourne Beach, all of Fla.

[73] Assignee: Harris Corporation, Cleveland, Ohio

[21] Appl. No.: 236,553

[22] Filed: Feb. 20, 1981

Related U.S. Application Data

[63] Continuation of Ser. No. 741,147, Nov. 11, 1976, abandoned.

[51] Int. Cl.³ .................... H04M 1/70; H04B 1/00
[52] U.S. Cl. .................... 179/1.5 E; 179/15.55 R;
328/166; 328/167; 375/13; 375/15; 455/46
[58] Field of Search .............. 179/15.55 R, 1.5 E; 328/166, 167; 343/178; 375/13, 15; 455/46

[56] References Cited

U.S. PATENT DOCUMENTS

| | | | |
|---|---|---|---|
| 3,133,991 | 5/1964 | Guanella | 179/1.5 R |
| 3,522,546 | 8/1970 | Jackson et al. | 328/167 |
| 3,617,948 | 11/1971 | Lucky | 333/18 |
| 3,633,107 | 1/1972 | Brady | 375/40 |
| 3,758,881 | 9/1973 | Rummler | 333/16 |
| 3,868,603 | 2/1975 | Guidoux | 333/18 |
| 3,879,664 | 4/1975 | Monsen | 375/14 |
| 4,004,226 | 1/1977 | Qureshi et al. | 375/13 |

OTHER PUBLICATIONS

O. Macchi et al.; *Annales des Telecommunications;* Sep. 1975; pp. 321-338.

L. Guidoux; *Onde Electronique;* vol. 55; No. 1, pp. 9-13; Jan. 1975.

*Primary Examiner*—S. C. Buczinski
*Attorney, Agent, or Firm*—Yount & Tarolli

[57] ABSTRACT

Source intelligence within a predetermined bandwidth is normally provided to a transmission channel having a bandwidth constraint of the predetermined bandwidth. For privacy transmission, a first pulse train indicative of the source intelligence is derived and is enciphered by addition of pseudo-random values to the pulses, either directly or modulo some specified constant. The enciphered pulse train is converted to first and second symbol pulse trains at subharmonic frequencies of the first pulse train. Energy within a selected spectrum is derived from each symbol pulse train, such as by filtering, and used to modulate first and second channels of a quadrature modulator having a carrier frequency centered within the predetermined bandwidth. A suppressed carrier quadrature modulated output is transmitted along with a carrier frequency component. Receiving means include a quadrature demodulator and means for reconstructing symbol pulse trains and means for reconstructing an additively enciphered pulse train from symbol pulse trains. The enciphered pulse train is provided to an adaptive filter and deciphering means for provision of an output to an intelligence utilization means. A training mode of operation is also provided in which calibrating information is transmitted from enciphering means to the deciphering means. Weights of the adaptive filter may be adjusted during the training mode, and the adaptive filter is synchronized to sample each transmitted symbol several times.

41 Claims, 3 Drawing Figures

APPARATUS FOR PRIVACY TRANSMISSION IN SYSTEM HAVING BANDWIDTH CONSTRAINT

This is a continuation, of application Ser. No. 741,147 filed Nov. 11, 1976, now abandoned.

BACKGROUND OF THE INVENTION

This invention relates to privacy transmission systems wherein signals indicative of source intelligence are enciphered and then transmitted through a communications channel having a known bandwidth constraint.

In a typical transmission system, a source of intelligence provides intelligence-bearing signals within a frequency range corresponding to a bandwidth constraint of a transmission channel. Analog output signals indicative of voice intelligence provided by a telephone are within the 3 kHz bandwidth constraint of the system. In privacy transmission, however, the output signals of the telephone must be enciphered. Transmission of these enciphered signals over the bandwidth limited channel often results in the introduction of significant distortion in the deciphered signal. The present invention relates to apparatus for additive enciphering and deciphering of signals indicative of source intelligence and for transmitting and receiving the enciphered signals over a narrow band channel, such as a standard telephone link, while minimizing the distortion produced thereby.

Additive enciphering is a form of enciphering in which a pseudo-random value is added directly or modulo some specified constant with the value of a pulse to determine a level or value of an enciphered pulse. Additive enciphering may be performed by analog or digital apparatus. In the case of analog enciphering, the analog level of the enciphered pulse is the value. In the case of a digital embodiment, an analog level is first converted into digital form, and a random number in digital form is added thereto in order to provide an enciphered and preferably binary output having a predetermined number of bits. Additive enciphering is distinguished from scrambling or mapping functions used for enciphering in which pulses are in a different order from the order in which they were generated. Scrambling functions are generally less desirable, however, since the introduction of a small error in the enciphered signal due to transmission lines characteristics may result in a large error in the subsequently desiphered signal.

Even in additive encipherment of signals, distortion introduced by transmission media, whether they be hard wire or atmospheric media, can produce unacceptable degradation of the deciphered signal. Therefore, it is desirable to provide an adaptive transversal filter in the receiving means. The adaptive transversal filter, sometimes referred to as an adaptive filter or adaptive equalizer, is a time domain signal equalizer which provides weights to incoming signals based upon the means square error between the received signal and a reference value. An example of one form of an adaptive transversal equalizer is illustrated in U.S. Pat. No. 3,798,560 issued Mar. 19, 1974, to Taylor. Another adaptive transversal filter and algorithm for adjusting weights therein are fully described in R. W. Lucky and H. R. Rudin, *An Automatic Equalizer For General Purpose Communication Channels*, Bell System R. W. Lucky, *Automatic Equalization for Digital Communication*, Bell System Technical Journal, April 1965, p 547. During a training mode at the beginning of a transmission weights of the adaptive filter are adjusted with each incoming signal.

In transversal filters currently in use, one sample of the incoming signal is taken in each symbol period. In these systems, the sampling time may be critical. The common practice of taking only one sample per symbol time of the adaptive equalizer may thus lead to achieving less than optimal response.

Further, since the receiving means must decipher the additively enciphered pulse train, the receiving means must also include a pseudo-random number generator. It is necessary to provide a means for synchronizing the pseudo-random number generator in receiving means with the pseudo-random number generator in the transmitting means.

SUMMARY OF THE INVENTION

It is therefore an object of the present invention to provide an improved method and apparatus in transmission means in a privacy transmission system for enciphering source intelligence and providing a modem for translation of the intelligence of the wide band signal to the transmission channel.

It is a further object of the present invention to provide a method and apparatus for privacy transmission of the type described further comprising receiving means for receiving, reconstructing, and deciphering signals produced by transmission means.

It is a further object of the present invention to provide a transmission system utilizing an adaptive transversal filter in which incoming data is sampled several times per transmitted symbol.

It is also an object of the present invention to provide a modem for translating signals to a transmission channel in which additively enciphered data is used for modulating a quadrature modulator having a carrier frequency within the bandwidth of the transmission channel.

It is another object of the present invention to provide a modem utilizing a quadrature demodulator for receiving quadrature modulated signals indicative of additively enciphered pulse train intelligence.

It is also an object of the present invention to provide a privacy transmission system in which a transmission means and a receiving means operate in a training mode in which the transmission means supplies an initial reference for an adaptive transversal filter in the receiving means and in which a cycle is provided in which incoming signals from the transmitting modem are compared to locally generated reference signals in the receiving means for setting adaptive filter weights which remain fixed during intelligence transmission.

Briefly stated, in accordance with the present invention, a system is provided for privacy transmission, in which a first pulse train indicative of the source intelligence is derived and is additively enciphered by addition of pseudo-random values to the pulses, either directly or modulo some specified constant. The enciphered pulse train is separated into first and second symbol pulse trains at subharmonic frequencies of the first pulse train. These pulse trains are filtered and then used to modulate first and second channels of a quadrature modulator having a carrier frequency within a predetermined bandwidth. The quadrature modulated output is transmitted to receiving means which includes a quadrature demodulator and means for reconstructing the symbol pulse trains and means for reconstructing an additively enciphered pulse train from symbol pulse trains. The enciphered pulse train is provided to an adaptive filter and deciphering means for provision of an output to an intelligence utilization means. A training mode of operation is also provided in which calibrating information is transmitted from enciphering means to the deciphering means. Weights of the adaptive filter may be adjusted during the training mode. Importantly, the incoming signal is sampled at a rate which is preferably a multiple of the symbol rate.

BRIEF DESCRIPTION OF THE DRAWINGS

The means and method by which the foregoing objects and features of invention are achieved are pointed out with particularity in the claims forming the concluding portion of the specification. The invention, both as to its organization and manner of operation may be further understood by reference to the following description taken in connection with the following drawings.

Of the Drawings.

DESCRIPTION OF THE PREFERRED EMBODIMENT

Transmission System

Figure 1:
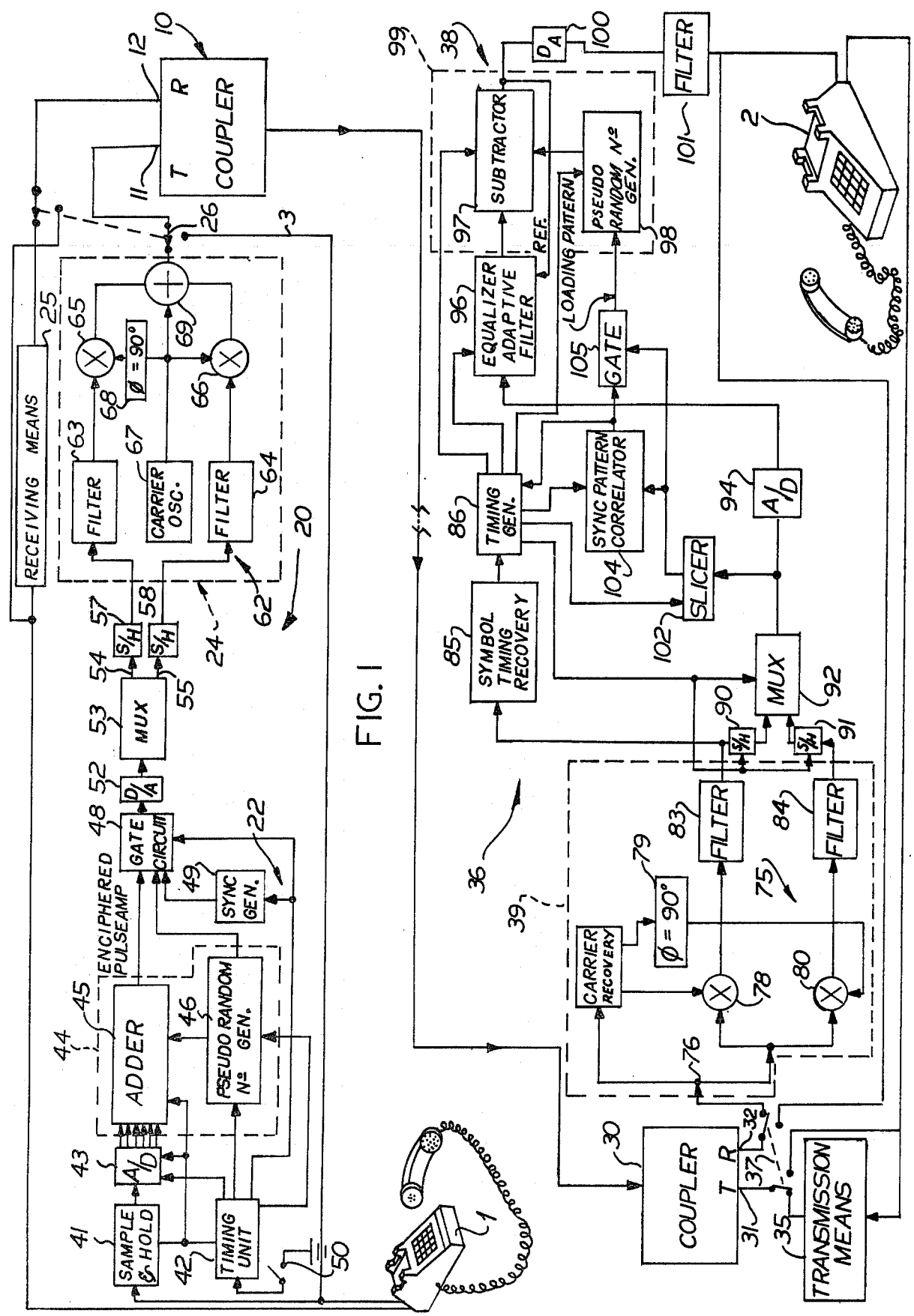
FIG. 1 is a block diagrammatic representation of a privacy transmission system utilizing transmission and reception means constructed and operating in accordance with the present invention.

Referring to FIG. 1, there is illustrated in block diagrammatic form a transmission system for privacy transmission from a source of intelligence 1 to intelligence utilization means via a transmission channel 3. In the present embodiment, the intelligence source and utilization means 1 and 2 comprise telephones and the transmission channel 3 is representative of standard telephone transmission circuits. The representation of the transmission channel 3 may include standard components which may be included such as transmission lines, filters, central switchboards and exchanges, repeaters, and radio transmission links.

The telephone 1 is coupled to the transmission line 3 by a standard coupler 10. The coupler 10 is a required interface between a telephone set and telephone circuits. The coupler 10 includes conventional impedance matching circuitry and telephone transmit-receive loop circuits. The telephone link over which the signals must be transmitted is commonly bandwidth limited to less than 3 kHz. The coupler 10 has a transmit terminal 11 for outgoing signals and a receive terminal 12 for incoming signals. Conventional signaling terminals (not shown) are also provided. For privacy communication, transmission means 20 are provided between the telephone 1 and the transmit terminal 11 including enciphering means 22 which provide an additively enciphered pulse train. In order to translate the intelligence embodied in the additively enciphered pulse train, quadrature modulation means 24 are connected between the enciphering means 22 and the transmit terminal 11. Receiving means 25 are coupled between the telephone 1 and the receive terminal 12. The receiving means 25 are described further below. The transmission means 20 and receiving means 25 comprise a modem. Switching means 26 are provided for selectively connecting appropriate terminals of the telephone 1 directly to the terminals 11 and 12 for normal communication or for connecting the transmission means 20 and receiving means 25 between the telephone 1 and the terminals 11 and 12 respectively for privacy communication.

Since the present invention will be discussed in the context of transmission from the telephone 1 and reception by the telephone 2, the receiving means 25 is described with respect to equipment coupled to the telephone 2. The coupling and transmission means and reception means coupled between the telephone 2 and transmission channel 3 may be identical to the equipment coupled between the telephone 1 and transmission channel 3. Transmission means 35, are provided for connection between the telephone 2 which may be identical to the transmission means 20, and transmit terminal 31. Receiving means 36 are provided for coupling between the telephone 2 and the receive terminal 32. Switching means 37 are provided for connecting the telephone 2 directly to the terminals 31 and 32 for normal transmission or for coupling the transmission means 35 and reception means 36 between the telephone 2 and the coupler 30 for privacy transmission.

The receiving means 36, to which the receiving means 25 may be identical, includes quadrature demodulation means 39 for receiving transmitted intelligence and reconstructing an enciphered pulse train therefrom and deciphering means 38 for providing deciphered intelligence to the telephone set 2. While the present embodiment is discussed in the context of a telephone voice transmission system, it will be seen that the present invention is applicable to other forms of intelligence sources and utilization means having similar bandwidth constraints.

Referring in greater detail to the transmission means 20, the telephone 1 provides an analog waveform indicative of voice intelligence. When the telephone 1 is connected for privacy transmission, it is connected to provide an output to a conventional sample and hold circuit 41 which provides a pulse amplitude modulated pulse train of pulses having analog values representative of sampled speech. The sample and hold circuit 41 is controlled by a timing unit 42 having a clock output connected thereto. The timing unit 42 includes clock circuits provided by well-known means to enable and synchronize operation as described below. A nominal sampling rate is 4.8 kilosamples per second. Particular clock rates provided by the timing unit 42 are preferred values for the present system, and are stated by way of exemplification only. An analog to digital converter 43 coupled to the output of the sample and hold circuit 41 quantizes the amplitude modulated pulses applied thereto to provide a binary word indicative of the analog value of the input pulse to the analog to digital converter 43. (Octal or other digital conversion could be provided, but binary conversion is preferred.) The analog to digital converter 43 also includes means having a second imput connected from the timing unit 42 for clamping the output to zero for use as described below. In a preferred embodiment, the analog to digital converter 43 provides a digital word having a length of 8 bits, whereby a digital word having an analog value of one of 256 levels indicative of the height of the amplitude modulated pulse is provided.

Additive enciphering means 44 include an adder 45 and pseudo-random number generator 46. In order to encipher the values provided by the analog to digital converter 43, the adder 45 includes appropriate register circuitry connected to receive the output thereof. The adder adds each eight bit number produced by the analog to digital converter 43 with a reproducable but pseudo-random number provided thereto from the pseudo-random number generator 46 which may be of conventional construction. The pseudo-random number generator 46 is connected to provide a first output preferably in parallel form to the adder 45. One output line is shown for simplicity of the drawing. The pseudo-random number generator is synchronized by an output connected from the timing unit 42 to produce an eight bit word representing a pseudo-random number for each sample taken by the sample and hold circuit 41. The pseudo-random number generator 46 also includes register means which may be selectively enabled to provide a second serial output representing the random number held therein at a second output terminal. The adder 45 includes means for adding the numbers provided thereto from the analog to digital converter 43 and pseudo-random number generator 46 either directly or modulo some specified constant so that an enciphered eight bit binary work is provided by the adder 45 for each sample.

Gate circuit 48 provides an eight bit parallel output which responds to one of three input sources in dependence upon a control signal supplied by timing unit 42. During the training mode, gate circuit 48 is caused to respond in selected intervals to serial binary signals supplied by sync generator 49. In other selected intervals during the training mode, gate circuit 48 is caused to respond to serial binary signals supplied by pseudo-random number generator 46. In either case, the receipt of a binary "1" signal by the gate circuit 48 will cause the eight bit parallel binary output thereof to assume a state corresponding to positive full scale, while the receipt of a binary "0" will produce an eight bit binary output corresponding to negative full scale. At all other times, the eight bit parallel output of gate circuit 48 will correspond to the eight bit parallel input supplied by adder 45.

The synchronism generator 49 is a pulse pattern generator for producing a repeating pattern of serial binary pulses, for example, a pattern of two binary "1's" and 30 binary "0's" which will be recognized by appropriate circuitry in the receiving means 36. Other synchronization patterns can be used. The synchronism generator is clocked by an input connected from the timing unit 42 to provide a 1.2 kHz output rate. The low output frequency of the synchronism generator 49 is useful for the purposes of recognition of the synchronizing signal by the receiving means. Also, the low transmission frequency with respect to the frequency constraint of 3 kHz results in minimal distortion in transmission. After the synchronizing signal is transmitted, the output of the synchronism generator 49 is disabled by the timing unit 42, and the random pulse generator 46 is enabled by the timing unit 42 to provide a serial binary output to gate circuit 48 which corresponds to the pseudo-random number contained in generator 46 at that time. This random number output will be received by receiving means 36 in order to load a pseudo-random pulse generator in the deciphering means. Again, output of the pseudo-random number generator 46 is clocked out serially at a rate of 1.2 kHz by an input from the timing unit 42. Since the pseudo-random pulse generators in the enciphering and deciphering sections are constructed similarly and contain the same pseudo-random number, the outputs of the two generators will thereafter be identical sequences of pseudo-random binary words. After the completion of transmission of the number in the pseudo-random number generator 46, the timing unit 42 ceases clocking thereof, and the output of the adder 45 is coupled through the gate 48.

The 8 bit parallel output of the gate 48 is provided to a digital to analog converter 52 which supplies a corresponding analog output to a "one-to-two" multiplexer 53 which is clocked at the 4.8 kHz sample rate by the timing unit 42. The multiplexer 53 provides alternate analog outputs at terminals 54 and 55 respectively. First and second sample and hold circuits 57 and 58 are connected to output terminals 54 and 55 of the multiplexer 53 and are clocked by the timing unit 42 at a 2.4 kHz bit rate to provide first and second non-return-to-zero (NRZ) pulse amplitude modulated pulse trains which each have a data content corresponding to alternate samples of the original analog input from the telephone 1. For purposes of the present description, the outputs of the sample and hold circuits 57 and 58 will be called symbol pulse trains.

A quadrature modulator 62 is provided including first and second filters 63 and 64 having inputs respectively connected to the outputs of the sample and hold circuits 57 and 58 and respectively providing outputs to mixers 65 and 66 of the quadrature modulator 62. A carrier oscillator 67 is provided having a carrier frequency which preferably lies in the center of the usable bandwidth of the telephone link, e.g., 1.8 kHz. The carrier oscillator 67 is directly connected to an input of the mixer 66 and coupled by a 90° phase shift circuit 68 to an input of the mixer 65. The outputs of the mixers 65 and 66 are provided to summing means 69 whose output (corresponding to the output of quadrature modulator 62) is coupled to the transmit terminal 11 of coupler 10. The carrier oscillator 67 also has an output connected to the summing means 69 so that a carrier component is provided to receiving means 36.

Filters 63 and 64 are included to condition the pulse trains appearing at the terminals 57 and 58 to be used as sources for modulating the 1.8 kHz carrier frequency. More specifically, the filters 63 and 64 are low pass filters having a 1.4 kHz cutoff. The output of modulator 62 thus has sidebands extending as low as 400 Hz and as high as 3.2 kHz (i.e., 1.8 kHz±1.4 kHz). Mixers 65 and 66 serve to suppress the carrier components of the modulated signals provided thereby. These carrier components could otherwise overdrive the telephone link thus adding further distortion. However, in order to aid in the synchronization of a local oscillator in the receiving means 36 with the output of the carrier oscillator 67, an input to the summing means 69 is provided from the carrier oscillator 67 so that the signal provided to the transmitted terminal 11 of the coupler 10 and transmitted to the transmission line 3 does include a carrier frequency component.

Assuming conventional switchboard and telephone routing circuitry (not shown) or other conventional circuitry has selected the telephone 2 as a called telephone, the above-described signal transmitted to the transmission line 3 is connected to the coupler 30. The terminal 32 is connected to the demodulation means 39 comprising a quadrature demodulator 75 having an input terminal 76 connected to the receive terminal 32 of the coupler 30. The input terminal 76 has a carrier recovery circuit 77 connected thereto which may comprise a well-known phase locked loop. The carrier recovery circuit 77 provides a carrier frequency output connected to a first terminal of a first mixer 78 and a carrier frequency output connected at a 90° phase shifter 79 which is connected to a first input terminal of a second mixer 80. Both the mixer 70 and 80 have second inputs connected to the input terminal 76 of the quadrature demodulator 75. The demodulating mixers 78 and 80 detect the incoming quadrature modulated signal and respectively provide outputs to first and second low pass filters 83 and 84 which are chosen to have a cut-off frequency of approximately 1.4 kHz. A symbol timing recovery circuit 85 is connected to the output of the filter 83 for providing a local clock frequency source derived from the received signals. The symbol timing recovery circuit 85 preferably comprises a well-known full wave rectifying phase locked loop. The symbol timing recovery circuit 85 is connected to synchronize a timing generator 85 which may comprise a frequency divider providing appropriate clock output rates. The outputs of the filters 83 and 84 comprise analog waveforms representative of energy in the zero to 1.4 kHz spectrum of the symbol pulse trains produced by the sample and hold circuits 57 and 58 of the transmission means 20.

In order to reconstruct pulse amplitude modulated symbol pulse trains at the outputs of the filters 83 and 84, first and second sample and hold circuits 90 and 91 are respectively connected to the outputs thereof and clocked at an appropriate rate. The sample and hold circuits 90 and 91 convert the demodulated output of the quadrature demodulator 75 into first and second pulse trains.

In accordance with the present invention, sample and hold circuits 90 and 91 are each clocked at a 4.8 kHz rate to provide respective first and second pulse trains. Since both sample and hold circuits acquire samples during each symbol period, the net result is that two samples are taken in each symbol period. The outputs of the sample and hold circuits 90 and 91 are connected to the input of a "two-to-one" multiplexer 92 which interleaves the output pulses of the sample and hold circuits 90 and 91 and converts the received first and second pulse trains into a received enciphered pulse train having a repetition rate of 9.6 kHz, i.e., twice the repetition rate of the pulse trains provided by the sample and hold circuits 90 and 91. The output of the multiplexer 92 is provided to an analog to digital converter 94 which provides binary words to an adaptive filter 96.

Figure 3:
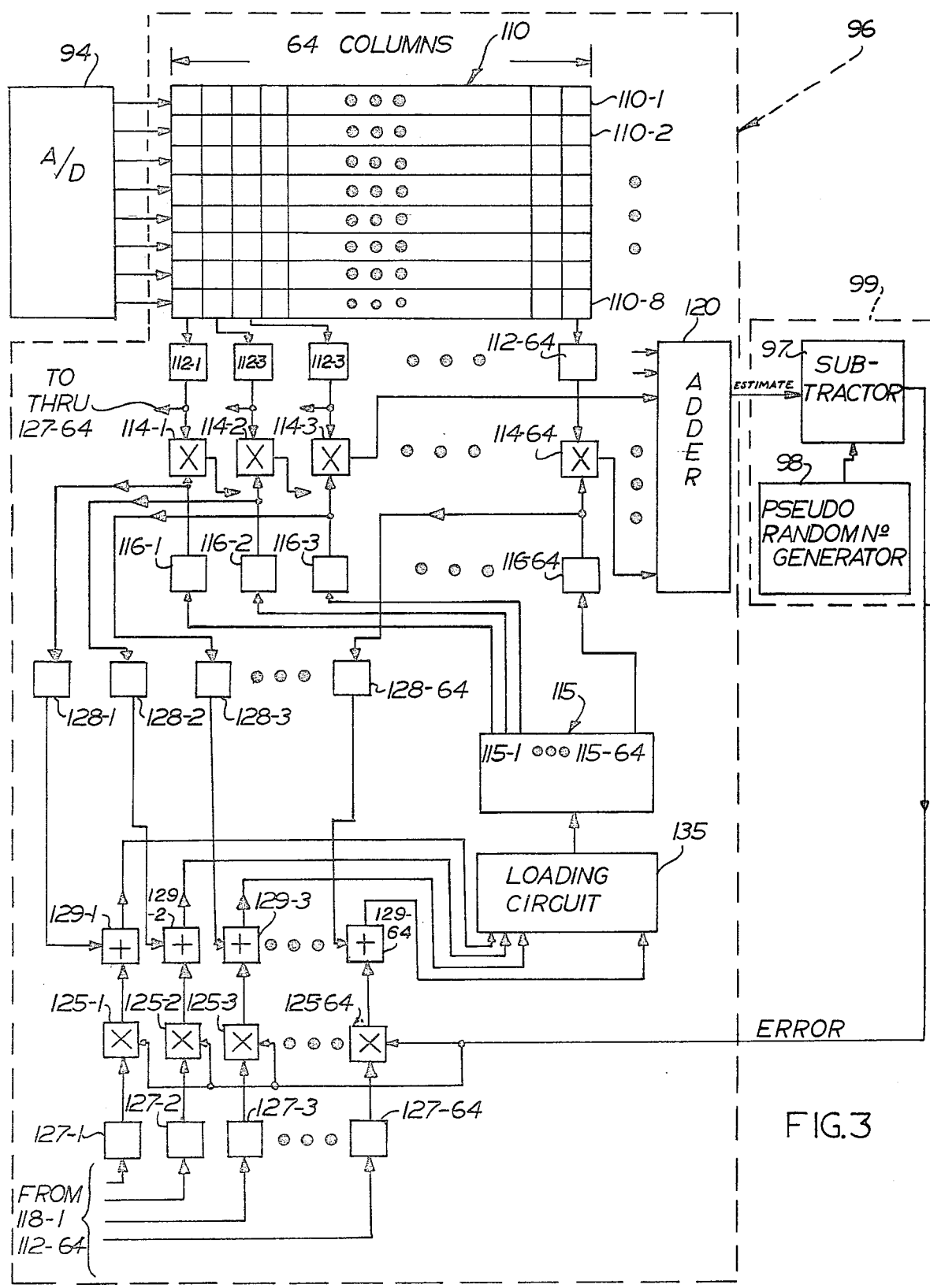

Adaptive transversal filter 96 is necessary to compensate the signal for crosstalk and various other forms of signal degradation commonly introduced in the transmission line 3. The adaptive transversal filter 96 is a time domain equalizer which provides an output corresponding to the sum of selected components of a number of signals which have been successively received thereby. A prior art adaptive transversal filter such as one according to the above-cited publication by Lucky may be utilized. Alternatively, an adaptive transversal filter interconnected as shown in FIG. 3 and described below may be utilized. Adaptive filtering is highly desirable to compensate received signals for distortion-inducing parameters between the telephones 1 and 2. Since telephone transmission routing almost always puts a call through different circuits each time a call is made, particularly in long distance transmission, different crosstalk and impedance parameters are present for each new connection of a calling telephone and a called telephone.

Additive deciphering means 99 include a subtractor 97 and a pseudo-random number generator 98. The output of the adaptive transversal filter 96 (which will ideally correspond exactly to the enciphered output of adder 45) is provided in the form of an eight bit binary word to an input of the subtractor 97 having the pseudo-random number generator 98 connected thereto. The subtractor 97 is arranged with pseudo-random number generator 98 such that the reverse of the algorithm performed by the enciphering means 44 is performed, thus providing a deciphered parallel digital output corresponding to the digital samples of the voice input successively provided by digital to analog converter 43. The pseudo-random number generator 98 is constructed so that it may be loaded with an initial pseudo-random number provided thereto during the training mode. The output of subtractor 97 is connected back to adaptive filter 96 to provide an error input thereto for calibration purposes to be described in greater detail hereinafter. The subtractor 97 also provides its digital output to a digital to analog converter 100 which provides a pulse amplitude modulated waveform to a filter 101 having an output connected to the telephone 2. The filter 101 smooths the pulse amplitude modulated output of the converter 100 for use by the telephone 2 in a conventional manner.

Figure 2:
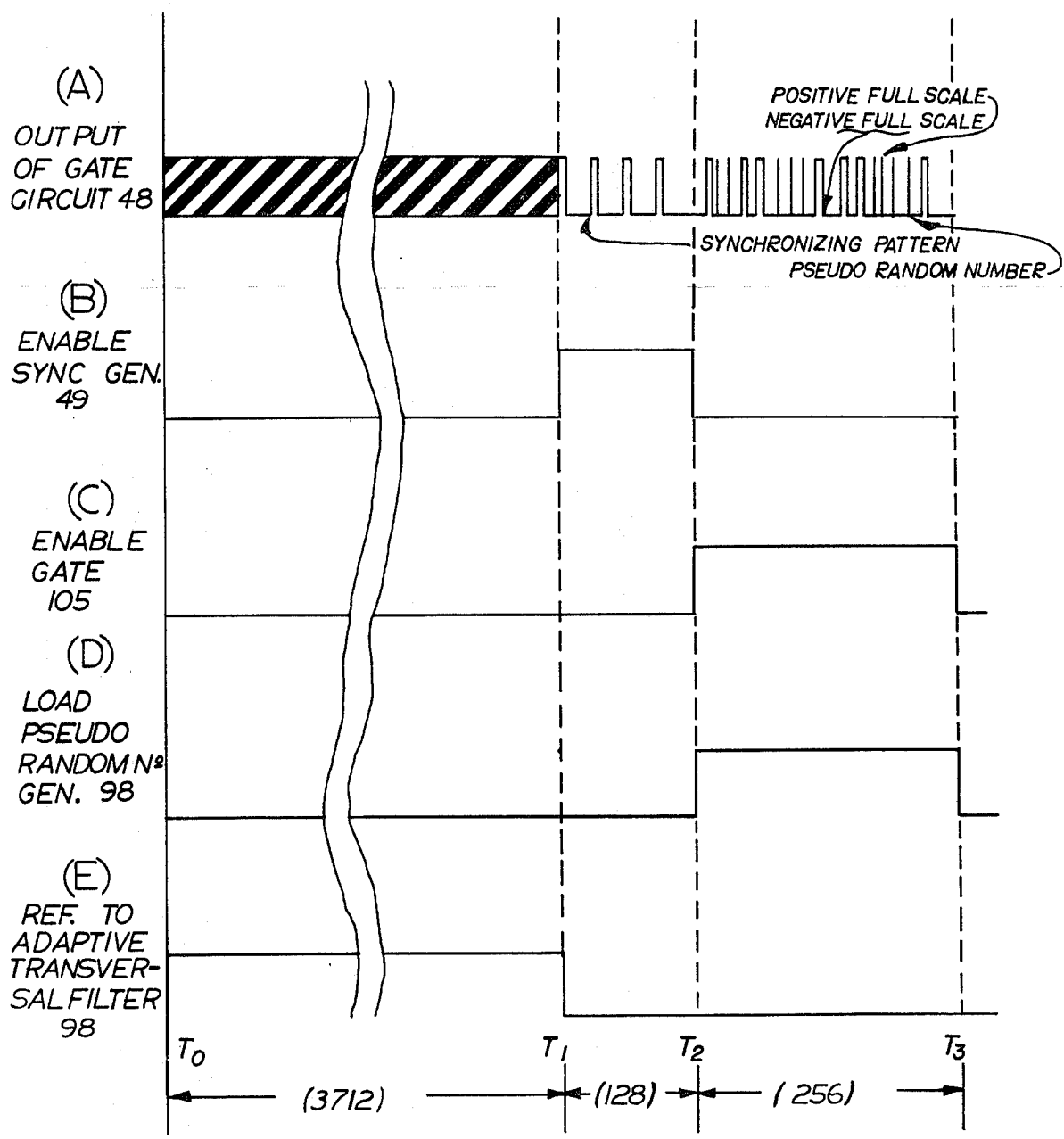
FIG. 2 is a timing diagram illustrating the training mode of operation in which deciphering means are calibrated and which weights are set in adaptive filtering means; and, FIG. 3 is a block diagrammatic representation of a preferred form of adaptive filter circuit for use in the present invention.

Synchronizing circuitry for use in the training mode described below with respect to FIG. 2 is provided. A slicer 102, having a timing input connected from the timing generator 86 senses the magnitude of the incoming pulses. If the signal at the input thereof is over a certain magnitude, then the output of slicer 102 is a binary "1". If the input is below that magnitude, then the output of slicer 102 is a binary "0". The resulting serial binary signal is directed to a synchronization pattern correlator 104, also having a timing connection from the timing generator 86. The synchronization pattern correlator 104 is a pulse pattern detector circuit present to provide a control signal output upon completion of reception of a pulse pattern produced by the synchronization generator 49 of the transmission means 20. The synchronization pattern correlator 104 provides the control signal connected to enable a gate 105. The gate 105 has an input from the slicer 102 and an output connected for loading the random number generated at low frequency in the transmission means 20 in a number register in the pseudo-random number generator 98 for initializing the operating conditions. Thereafter, the random number generator 98 will operate to produce the same pseudo-random number produced by the random number generator 46. This may be referred to as completing the loading pattern, and a signal indicative thereof is provided to the timing generator 86 which includes gate circuitry to enable clocking and operation of the adaptive transversal filter 96 and deciphering means 99.

In one form of employment of the present invention, the switching means 26 and 37 respectively initially connect the telephones 1 and 2 for normal transmission. After a connection is established between the telephones 1 and 2, the parties manually switch the switching means 26 and 37 for privacy transmission. The party at telephone 1 closes the switch 50 to initiate the training mode.

Training Mode

The training mode is necessary both for loading the pseudo-random number generator 98 (to synchronize the operation thereof with pseudo-random number generator 46) and for setting the adaptive transversal filter to compensate for distortion in the particular transmission path established between the telephones 1 and 2. FIG. 2 is a waveform chart illustrating one cycle of the training mode of operation. The training mode continues cyclically while the switch 50 is closed. The training mode is preferably continued for several seconds, during which the training cycle illustrated in FIG. 2 is repeated. The exact time duration of the training mode is not critical. The minimum duration desired for a training mode operation depends on the manner in which the adaptive transversal filter 96 operates.

In FIG. 2, comprising FIGS. 2a–2e, the common abscissa is time. In the preferred form, a training cycle has a length of 4096 pulse periods, with a pulse period corresponding to the pulse period of the frequency at which the analog voice transmission is sampled. The operation illustrated is that of a system including the preferred form of adaptive transversal filter described below with respect to FIG. 3. At the initiation of a training mode, the operator of telephone 1 closes the switch 50 connected to the timing unit 42. The output of sample and hold circuit 41 is clamped to zero. Since the input to the adder 45 comprises zero values, the output of the adder 45 comprises the pseudo-random number produced by the random number generator 46. For the first several cycles of the training mode, the receiving means receives the output of the transmission means to derive timing information therefrom. The training mode is characterized by three subcycles. As illustrated in FIG. 2a, which is representative of the 8 bit digital output of the gate circuit 48, from time t0 to time t1 the timing circuit enable the gate circuit 48 to provide the output of the adder 45 for 3712 pulse periods. The shaded area is representative of the 8 bit digital output produced during this period. From time t1 to time t2, the gate circuit 48 responds to the output of the synchronism generator 49 for 128 pulse periods, and from time t2 to time t3, the gate circuit 48 responds to the serial output of the pseudo-random number generator. For simplicity in the drawing, the actual number of words produced during each subcycle are not illustrated.

At time t1, the timing unit 42 provides an output for enabling the production of the synchronizing pattern of the synchronism generator 48. This is illustrated in FIG. 2b as an enabling signal to the synchronism generator 49. The synchronizing pattern of 32 digits is clocked at 1.2 kHz or one quarter of the additively enciphered pulse train rate. The slicer 102 in the reception means 36 couples the received binary pattern to the synchronization pattern correlator 104 which responds to the longer pulses. At completion of the synchronization pattern at time t2, the synchronization pattern correlator 105 provides an output illustrated in FIG. 2c as "enable gate 105" so that the output of the slicer 102 is connected to the load input of the pseudo-random number generator 98. This output of the synchronization pattern correlator 104 is also connected to the timing unit 86, which includes circuitry responsive thereto for disabling operation of the adaptive transversal filter 96 and deciphering means 99 until time t3. At time t2, the timing unit 42 enables the serial output of the pseudo-random number generator 46 and causes gate circuit 48 to respond thereto. At this time, the random number in the pseudo-random number generator 44 is sent to the receiving means so that when the enciphering means 44 and deciphering means are again enabled at time t3, the pseudo-random number generators 46 and 98 will be producing the same numbers. This operation is labeled in FIG. 2d as "load pseudo-random number generator 98." The number in the pseudo-random number generator 46 is clocked out at the 1.2 kHz rate to minimize error. The received binary pattern is supplied from the slicer 102 by the gate 105 to the serial input of the pseudo-random generator 98 to synchronize the enciphering means 99.

At time t3, corresponding to time t0 of a next cycle, the enciphering means 44 and deciphering means 99 are no longer disabled, but the analog output of sample and hold circuit 41 is still clamped to zero. Consequently, 8 bit parallel binary words are provided at the output of the gate circuit 48 from the adder 45 which correspond to the pseudo-random numbers now sequentially provided by pseudo-random number generator 46. Corresponding binary words, distorted by crosstalk and other error components, are thus provided by analog to digital converter 94 to adaptive transversal filter 96. If the filter 96 is adjusted properly, the output thereof will correspond to the random numbers provided by pseudo-random number generator 46. Assuming pseudo-random number generator 98 has been properly loaded, the output thereof will also reflect this number. Consequently, the output of subtractor 97 will ideally be zero during this portion of the training mode. The adaptive transversal filter 96 operates as described below with respect to FIG. 3 to minimize the root mean square error between values of the received binary words and values of the locally generated binary words. The comparison serves to set weights in the adaptive transversal filter 96 which remain fixed at completion of the training mode. Upon opening of the switch 50, the timing unit 42 controls completion of the current training cycle, and the transmission mode is reverted to. The receiving means 26 is calibrated to decipher detected signals which have been transmitted over the transmission channel 2. For two-way privacy communication, the transmission means 35 connected to the telephone 2 and receiving means 25 connected to the telephone 1 may also cooperate in a training mode.

Adaptive Transversal Filter

The preferred form of the adaptive transversal filter 96 and an interconnection thereof in the present system is illustrated in FIG. 3 which is a block-diagrammatic representation of the adaptive filter 96. Appropriate clocking signals are provided by the timing unit 86. In FIG. 3, the same reference numbers are used to denote components corresponding to those in FIG. 1. As seen in FIG. 3, the eight bits at the output from the analog to digital converter 94 are connected in parallel to the adaptive filter 96. The eight bits of the digital word corresponding to each sample taken by the converter 94 may be labeled bit 1 through bit 8 and are respectively connected to shift input stages of shift registers 110-1 through 110-8 which form a shift register bank 110. The shift registers 110-1 through 110-8 in one preferred embodiment are each 64 bits long. Each shift register 110-1 through 110-8 may be viewed as a row, and corresponding stages of each of the shift registers 110-1 through 110-8 may be viewed as a column. Each column in effect contains each successive digital word. As digital words are produced by the converter 94, they are shifted into the first column of the shift register bank 110. Consequently, column 1 of the shift register bank 110 contains the most recently produced word from the converter 94, and each of the remaining columns contain an earlier produce word. Each column is connected to provide a word to one of a number of 8 bit registers 112-1 through 112-64. Each register provides an output to a multiplexer 114-1 through 114-64.

A weight in the form of a binary number is accessed by clock means from a location of a memory 115 having locations 115-1 to 115-64 to provide respective outputs to registers 116-1 to 116-64 connected, to a second input of each respective multiplier 114-1 to 114-64. These weights represent estimates of the extent to which each of the words in shift register bank 110 contribute to the particular word being recovered. It is desirable that the lengths of the weights stored in locations 115-1 to 115-64 be 24 bits long to provide the desired resolution with the 12 most significant bits being provided for multiplying by each multiplier 114. Each multiplier 114 provides a result. Clock cycles are provided for accessing each location of the memory and each eight bit word from each column simultaneously. Sixty-four results are thus provided by the multipliers 114, and provide 14 bit long results to an adder 120. The adder 120 is interconnected to include appropriate register means for adding all 64 results to produce an estimate. The estimate is the output of the adaptive transversal filter 96 indicative of a received signal. The twelve most significant bit of the estimate are provided to the deciphering subtractor 97. The difference between the estimate and the current random number produced by the random number generator 98 is referred to as an error number. In the privacy transmission mode, the error number, or the error number as modified by the form of modulo subtraction, is the output of the deciphering means. The weights used remain fixed during each clock period. In the training mode, weights are updated as follows.

The error number is supplied to 64 more multipliers 125-1 to 125-64. Further registers 127-1 through 127-64 hold the number comprised by each column of the shift register bank 110 and respectively supply second inputs to each multiplier 125-1 through 124-64 respectively. Sixty-four error results are thus provided and coupled to adders 129-1 through 129-64. The weights accessed from the memory locations 115-1 through 115-64 are provided from the registers 116-1 to 116-64 to registers 128-1 through 128-64 for respective coupling to the adders 129-1 through 129-64. The adders 129-1 through 129-64 respectively provide updated weights. Loading circuit 135 comprising appropriate register circuits is used to load the results comprising the updated weights from the adders 129-1 through 129-64 to locations 115-1 through 115-64 of the weight memory 115 respectively. In this manner updated weights are produced. One weight is provided in each location of the memory 115 for multiplying each column of the shift register bank 110. When the training mode ceases, the timing generator 86 disables the circuitry for updating the weights and the weights remain fixed.

In accordance with the present invention, response of the adaptive filter 96 is improved by shifting the inputs through the register bank 110 at twice the symbol frequency of the transmission means 20. In order to do this, the sample and hold circuits 90 and 91 are clocked at twice the frequency of the sample and hold circuits 57 and 58 of the transmission means 20. Similarly, the multiplexer 92 is clocked at twice the frequency at which the multiplexer 53 is clocked. The timing means 86 in this embodiment clock inputs into two columns of the shift register bank 110 during the clock period in which one estimate is produced. In this manner, means are provided wherein the adaptive filter takes two samples per transmitted symbol. Consequently, criticality is decreased of the point of sampling time during each pulse period of the sample and hold circuits 90 and 91. Further, the ability to adjust weights in response to changes in signal levels since two samples per signal are obtained. It is also seen that the shift register bank 110 holds information indicative of 32 transmitted symbols as opposed to 64 transmitted symbols which would be done by a prior art adaptive filter.

Summarizing, for normal transmission, the switching means 26 and 37 are closed to connect the telephone sets 1 and 2 to the couplers 10 and 30 respectively. For privacy transmission, the switching means 26 and 37 are switched to their other position so that privacy transmission may begin. Since the calling telephone 1 is reaching an arbitrarily selected telephone 2, the receiving means of the telephone set 2 must be calibrated. The operator closes the switch 50 in the transmission means 20 to initiate a training mode in which synchronization information is first transmitted to the receiving means 36 so that the receiver means 36 may recognize that a loading sequence will be transmitted. The random number from the pseudo-random number generator 46 is transmitted to synchronize the pseudo-random number generator 98 of the receiving means 36. Since the random number generator number is transmitted during repeated training cycles and at a low frequency, the random number received may be assumed to be correct. A training mode then continues in which the high frequency transmission is resumed and transmitted random numbers are compared to locally generated random numbers in the receiving means 36 in order to adjust weights in the adaptive transversal filter 96. The training mode is necessary since telephone calls will almost invariably take different routes over different transmission channels including different switchboards, cables and trunk circuits having their own peculiar crosstalk characteristics and other features contributing to signal degradation.

Although the present invention has been discussed in the context of a voice privacy transmission system, it will be seen by those skilled in the art that the present invention is well suited for use in other environments as well. The invention is particularly suited, however, for use in the described application. The use of an adaptive transversal filter which samples twice per symbol time is of great value in reducing distortion and rendering the adaptive transversal filter relatively insensitive to the time at which an incoming signal is sampled. Many departures may be made from the specific circuitry shown to produce a transmission system constructed in accordance with the present invention.

What is claimed is:

1. Apparatus for communicating an analog signal over a bandwidth constrained channel comprising:
transmitter means including sampling means for sampling said analog signal at a first rate so as to provide periodic samples of said analog signal occurring at first repetition rate, multiplexer means responsive to said samples of said analog signal for deriving first and second pulse amplitude modulated signals therefrom each bearing the information contained in alternate samples of said analog signal, and quadrature modulator means responsive to said first and second pulse amplitude modulated signals for respectively modulating first and second orthogonal carrier signals in accordance therewith and for combining and transmitting said modulated orthogonal signals over said bandwidth constrained channel; and, receiver means including quadrature demodulator means for receiving said modulated orthogonal signals which have been transmitted over said channel and for recovering said first and second pulse amplitude modulated signals therefrom, sampling means responsive to said first and second pulse samplitude modulated signals for alternately sampling said signals at a rate which is greater than said first repetition rate, and filtering means for adaptively weighting and combining said samples to provide a filtered output signal corresonding to said analog signal, said filtering means including means for storing a plurality of consecutive said samples, coefficient circuitry for multiplying each of said stored samples by a respective coefficient to provide a plurality of weighted signals, output means responsive to said weighted samples for deriving said filtered analog signal therefrom, and automatic coefficient adjustment circuitry for automatically adjusting said coefficients so as to thereby automatically adapt said filtering means.

2. Apparatus as set forth in claim 1 and further comprising means for training said adaptive filter including first means associated with said transmitter means for providing a statistically random, multilevel first signal having a determinable information content to said multiplexer means, second means associated with said receiver means for reproducing said first signal, means for comparing said filtered output signal with said reproduced first signal, and means for adjusting the weights in said adaptive filter in dependence upon the results of said comparison.

3. Apparatus as set forth in claim 2, wherein said first means and said second means each includes a like pseudorandom number generator for providing said first signal, and wherein means are provided for synchronizing the operation of said pseudorandom number generators so that said generators produce the same pseudorandom numbers, said synchronizing means including means for loading the pseudorandom number contained in one of said generators into the other of said generators.

4. Apparatus as set forth in claim 3, wherein said synchronizing means includes means for transmitting said pseudorandom number to be loaded into the other of said generators over said channel one digit at a time as a bilevel signal such that a positive full scale signal transmitted over said channel signifies one binary data state and a negative full scale signal transmitted over said channel signifies the other binary data state.

5. In a QAM receiver of the type adapted to receive bursts of signals having a bandwidth B Hz and sent at a predetermined rate of 1/T signals per second over a channel, wherein the receiver includes an automatic adaptive equalizer having taps spaced equally apart, tap coefficient circuitry for multiplying the output of each tap by a respective tap coefficient, and adjustment circuitry for adjusting said tap coefficients, output circuitry responsive to said equalizer for providing output signals at times $kT+t$, $k=0, 1, \ldots$, where t is a timing epoch, and detection circuitry for detecting the presence of an incoming burst of signals at a predetermined position in said receiver, that improvement wherein said taps are spaced apart by $T/n$ seconds, where n is greater than TB, and control circuitry is provided for early actuation of said adjustment circuitry at a predetermined time dependent upon the time of said detection, to begin adjustment of said tap coefficients and hence training of said equalizer regardless of the initial value of said timing epoch, whereby the data capacity of said receiver is increased by reduction of the time required for set up of said receiver.

6. The improvement of claim 5 wherein said detection circuitry comprises means for detecting the arrival of an incoming burst of signals at said receiver, and said control circuitry comprises means for actuating said adjustment circuitry within a predetermined time interval after such detection.

7. The improvement of claim 5 wherein said predetermined time interval is less than the total delay length of said equalizer.

8. The improvement of claim 5 wherein n is an integer greater than 1.

9. The improvement of claim 8 wherein $n=2$.

10. The improvement of claim 5 wherein said receiver includes sampling circuitry for sampling received signals at a rate of $n/T$ samples per second and providing said samples to said equalizer.

11. The improvement of claim 5 wherein said control circuitry comprises means for actuating said adjustment circuitry to begin training of said equalizer when the first signal in said burst has arrived at a pre-selected tap position in said equalizer at which it is desired to locate the principal tap coefficient.

12. The improvement of claim 5 wherein said receiver includes timing recovery circuitry comprising means for establishing and keeping the principal said tap coefficient within a predetermined number of taps from the center of said equalizer.

13. The improvement of claim 5 wherein said receiver is part of a central station in a multi-point transmission system having in addition a central transmitter and at least one remote transmitter/receiver station.

14. The improvement of claim 13 wherein each of said at least one remote transmitter is adapted to send a training sequence as a preamble of each said burst, and said control circuitry of said central receiver comprises means to actuate said adjustment circuitry to begin training of said equalizer with the first signals in said preamble.

15. The improvement of claim 5 wherein said receiver includes timing recovery circuitry for adjusting t, and said control circuitry comprises means for actuating said adjustment circuitry.

16. In a receiver having an adaptive equalizer to which received signals are applied for filtering received signals having information originally provided in discrete symbol intervals occurring at a first rate, said adaptive equalizer including means for sampling said received signals and means for weighting and combining the resulting samples to provide filtered signals and means for adjusting the weights of said samples, the improvement wherein;
said sampling means samples said received signals at a rate greater than said first rate, and said adjusting means includes means for beginning said adjusting of said weights, and thus training of said equalizer, within a predetermined time after receipt of said received signals and regardless of the initial timing relationship between said sampling of said received signals and said discrete symbol intervals.

17. In a receiver as set forth in claim 16 including means for detecting the arrival of said received signals.

18. In a receiver as set forth in claim 17 including means for beginning the adjusting of said weights within a predetermined time interval after said detection of said arrival.

19. In a receiver as set forth in claim 16 wherein said sampling means samples said received signals at a second rate and which is a multiple of said first rate.

20. In a receiver as set forth in claim 19 wherein said second rate is an even mutiple of said first rate.

21. In a receiver as set forth in claim 19 wherein said second rate is twice that of said first rate.

22. In a receiver as set forth in claim 16 wherein said adaptive equalizer includes means for storing a plurality of consecutive said samples and means for beginning the adjusting of said weights once a predetermined number of samples has been stored.

23. In a communications system having a transmitter and a receiver adapted to provide communications over a communications channel, comprising
said transmitter includes means for transmitting an information bearing signal in discrete symbol intervals occurring at a first rate; and
said receiver includes an adaptive equalizer to which received signals are applied for filtering thereof with said adaptive filter including means for samplng said received signals and means for weighting and combining the resulting samples to provide filtered signals and means for adjusting the weights of said samples, said sampling means sampling said received signals at a greater than said first rate and said adjusting means includes means for beginning said adjusting of said weights and thus training of said equalizer within a predetermined time after receipt of said received signals and regardless of the initial timing relationship between said sampling of said received signals and said discrete symbol intervals.

24. In a communications system as set forth in claim 23, wherein said transmitter includes means for sampling a said information bearing signal at said first rate and multiplexer means responsive to said sampled information signal for providing first and second pulse amplitude modulated signals therefrom, each bearing the information contained in alternate samples of said information signal.

25. In a communications system as set forth in claim 24 wherein said transmitter further includes quadrature modulator means responsive to said first and second pulse amplitude modulated signals for respectively modulating first and second orthogonal carrier signals in accordance therewith and for combining and transmitting said modulated signals over said communications channel.

26. In a communications system as set forth in claim 25 wherein said receiver further includes quadrature demodulator means for receiving said modulated orthogonal signals for recovering said first and second pulse amplitude signals therefrom.

27. In a communications system as set forth in claim 26 wherein said sampling means alternately samples said first and second pulse amplitude modulated signals at said greater rate.

28. In a communications system as set forth in claim 27 wherein said greater rate is an even multiple of said first rate.

29. In a communication system as set forth in claim 28 including means for detecting the arrival of said orthogonal signals and means for beginning the adjusting of said weights within a predetermined time interval after said detection of said arrival.

30. A method of filtering a received signal including symbols transmitted in discrete time intervals occurring at a first rate comprising sampling said received signal and weighting and combining the resulting samples to thus provide a filtered signal and adjusting the weights of the samples, the improvement wherein;
the step of sampling said received signal includes the step of sampling at a rate greater than said first rate and
said weighting step includes the step of beginning adjustment of said weighting within a predetermined time after the arrival of said received signal regardless of the initial timing relationship between said sampling and said discrete time intervals.

31. A method as set forth in claim 30 wherein said weighting step includes the step of detecting the arrival of said received signal.

32. A method as set forth in claim 31 wherein said weighting step further includes the step of beginning the adjusting of said weighting within a predetermined time interval after detecting the arrival of said received signal.

33. A method as set forth in claim 32 wherein said sampling step includes the step of sampling said received signal at a rate which is an even multiple of said first rate.

34. A method as set forth in claim 32 wherein said sampling of said received signal is at a rate which is twice that of said first rate.

35. An adaptive equalizer for processing a received signal having information provided in discrete intervals occurring at a first rate, the adaptive equalizer comprising:
sampling means for producing a resulting sampled signal by sampling the received signal at a second rate greater than said first rate;
means for weighting and combining samples from said resulting sampled signal in order to provide filtered output signals; and
means for adjusting said means for weighting and combining within a predetermined time after receipt of the received signals and independent of the initial timing relationship between the discrete intervals of the received signal and said resulting sampled signal.

36. An adaptive equalizer as set forth in claim 35 wherein said second rate is a multiple of said first rate.

37. An adaptive equalizer as set forth in claim 36 wherein said second rate is an even multiple of said first rate.

38. An adaptive equalizer as set forth in claim 35 including means for storing a plurality of consecutive said sampled signals and means for beginning said adjusting of said means for weighting once a predetermined number of said sampled signals have been stored.

39. A method for processing a received signal having information provided in discrete intervals occurring at a first rate, comprising the steps of:
sampling the received signal at a second rate greater than said first rate in order to produce a resulting sampled signal;
weighting and combining samples from said resulting sampled signal in order to provide filtered output signals; and beginning adjustment of said weighting within a predetermined time after receipt of the received signal and independent of the initial timing relationship between the discrete intervals of the received signal and said resulting sampled signal.

40. A method as set forth in claim 39 including the steps of storing a plurality of consecutive said samples and beginning said adjustment of said weighting once a predetermined number of said samples have been stored.

41. A method as set forth in claim 39 wherein said second rate is an even multiple of said first rate.

* * * * *